(12) United States Patent
Sun et al.

(10) Patent No.: US 11,371,735 B2
(45) Date of Patent: Jun. 28, 2022

(54) AIR CONDITIONING SYSTEM AND METHOD OF CONTROLLING THE SAME

(71) Applicant: Samsung Electronics Co., Ltd, Suwon-si (KR)

(72) Inventors: Woong Sun, Incheon (KR); Yong Sang Kong, Suwon-si (KR); Chang Soo Lim, Hwaseong-si (KR); Sung Jin Cho, Suwon-si (KR); Sung Tae Kim, Hwaseong-si (KR); Chang Seo Park, Suwon-si (KR); Dong Seok Bae, Suwon-si (KR); Kwang Nam Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 16/608,805

(22) PCT Filed: Mar. 21, 2018

(86) PCT No.: PCT/KR2018/003269
§ 371 (c)(1),
(2) Date: Oct. 25, 2019

(87) PCT Pub. No.: WO2018/199474
PCT Pub. Date: Nov. 1, 2018

(65) Prior Publication Data
US 2020/0191423 A1 Jun. 18, 2020

(30) Foreign Application Priority Data
Apr. 25, 2017 (KR) .................. 10-2017-0053028

(51) Int. Cl.
*F24F 11/30* (2018.01)
*F24F 11/65* (2018.01)
(Continued)

(52) U.S. Cl.
CPC .............. *F24F 11/30* (2018.01); *F24F 11/65* (2018.01); *F24F 11/83* (2018.01); *F25B 13/00* (2013.01);
(Continued)

(58) Field of Classification Search
CPC .. F24F 11/30; F24F 11/65; F24F 11/83; F24F 11/84; F24F 3/065; F24F 5/001;
(Continued)

(56) References Cited

U.S. PATENT DOCUMENTS 4,926,652 A * 5/1990 Kitamoto ................ F25B 13/00
62/175
5,410,887 A * 5/1995 Urata ..................... C09K 5/045
62/114

(Continued)

FOREIGN PATENT DOCUMENTS

EP 2538145 A2 12/2012
EP 2728280 A1 5/2014

(Continued)

OTHER PUBLICATIONS

International Search Report dated Jul. 12, 2018 in connection with International Patent Application No. PCT/KR2018/003269, 2 pages.

(Continued)

*Primary Examiner* — Ramesh B Patel

(57) ABSTRACT

The disclosure an air conditioning system and a method of controlling the same. During the heating operation of the A2W indoor unit, the A2A valve that connects the outdoor unit to the A2A indoor unit is closed to prevent the inflow of the refrigerant into the A2A indoor unit, so it is possible to prevent performance degradation by improving performance loss due to refrigerant bypass to a stationary A2A indoor unit. In addition, in order to improve the performance due to deterioration of heating performance, the system itself can (Continued)

cope with a control algorithm without any additional hardware configuration, thereby minimizing the installation cost.

15 Claims, 11 Drawing Sheets

(51) Int. Cl.
*F24F 11/83* (2018.01)
*F25B 13/00* (2006.01)
*F25B 49/02* (2006.01)
*G05B 15/02* (2006.01)
*F25B 41/24* (2021.01)

(52) U.S. Cl.
CPC .............. *F25B 41/24* (2021.01); *F25B 49/02* (2013.01); *G05B 15/02* (2013.01); *F25B 2313/003* (2013.01); *F25B 2313/0233* (2013.01); *F25B 2600/2513* (2013.01)

(58) Field of Classification Search
CPC .. F24F 11/54; F24F 11/62; F24F 11/67; F25B 13/00; F25B 41/20; F25B 49/02; F25B 2313/003; F25B 2313/0233; F25B 2600/2513; G05B 15/02
See application file for complete search history.

(56) References Cited

U.S. PATENT DOCUMENTS

| | | | | | |
|---|---|---|---|---|---|
| 5,467,604 | A | * | 11/1995 | Sekigami | F25B 13/00 62/117 |
| 5,490,399 | A | * | 2/1996 | Sada | F25B 13/00 62/510 |
| 5,493,871 | A | * | 2/1996 | Eiermann | F24F 3/153 62/173 |
| 5,526,649 | A | * | 6/1996 | Sada | F24F 1/26 62/175 |
| 5,619,863 | A | * | 4/1997 | Kil | F24F 1/10 62/428 |
| 5,664,421 | A | * | 9/1997 | Matsue | F25B 9/14 62/6 |
| 5,802,862 | A | * | 9/1998 | Eiermann | F24F 3/14 165/228 |
| 6,026,654 | A | * | 2/2000 | Park | F25B 41/20 62/199 |
| 6,119,478 | A | * | 9/2000 | Sada | F25B 13/00 62/434 |
| 9,528,732 | B2 | * | 12/2016 | Kim | F25B 25/005 |
| 10,852,007 | B2 | * | 12/2020 | Kawashima | F24H 4/00 |
| 2013/0167559 | A1 | * | 7/2013 | Kim | F24D 19/1087 62/56 |
| 2014/0138064 | A1 | * | 5/2014 | Jang | F25B 41/20 165/108 |
| 2018/0328602 | A1 | * | 11/2018 | Vandermeulen | F24F 3/14 |
| 2019/0331346 | A1 | * | 10/2019 | Kawashima | F25D 17/02 |

FOREIGN PATENT DOCUMENTS

| | | |
|---|---|---|
| EP | 2765371 A1 | 8/2014 |
| JP | 2015-094573 A | 5/2015 |
| KR | 10-2005-0045802 A | 5/2005 |
| KR | 10-0792518 B1 | 1/2008 |
| KR | 10-2011-0099558 A | 9/2011 |
| KR | 10-2013-0000491 A | 1/2013 |
| KR | 10-2013-0044890 A | 5/2013 |
| KR | 10-2013-0079990 A | 7/2013 |
| KR | 10-2014-0054552 A | 5/2014 |
| KR | 10-2014-0063931 A | 5/2014 |
| WO | 2015072342 A1 | 5/2015 |

OTHER PUBLICATIONS

Written Opinion of the International Searching Authority dated Jul. 12, 2018 in connection with International Patent Application No. PCT/KR2018/003269, 8 pages.
Notice of Preliminary Rejection dated Aug. 21, 2021, in connection with Korean Application No. 10-2017-0053028, 16 pages.
Notice of Allowance dated Nov. 5, 2021, in connection with Korean Application No. 10-2017-0053028, 3 pages.
Supplementary European Search Report in connection with European Application No. 18790680.5 dated Feb. 28, 2020, 8 pages.
Communication pursuant to Article 94(3) EPC dated Dec. 15, 2021, in connection with European Application No. 18790680.5, 5 pages.

* cited by examiner

FIG. 4

| OPERATION MODE | COOLING (REVERSE DIRECTION) | | HEATING (FORWARD DIRECTION) | | A2A TERMINATION |
| --- | --- | --- | --- | --- | --- |
| | A2A IN OPERATION | A2W IN OPERATION | A2A IN OPERATION | A2W IN OPERATION | |
| REFRIGERANT FLOW | FLOW REFRIGERANT | FLOW REFRIGERANT | FLOW REFRIGERANT | PREVENT REFRIGERANT | FLOW REFRIGERANT → PREVENT REFRIGERANT |
| A2A VALVE | OFF | OFF | ON | OFF | OFF |
| SECOND EXPANSION VALVE | OPEN | OPEN | OPEN | CLOSE | OPEN → CLOSE |

FIG. 7

| OPERATION MODE | COOLING (REVERSE DIRECTION) | | HEATING (FORWARD DIRECTION) | | A2A TERMINATION |
|---|---|---|---|---|---|
| | A2A IN OPERATION | A2W IN OPERATION | A2A IN OPERATION | A2W IN OPERATION | |
| REFRIGERANT FLOW | FLOW REFRIGERANT | FLOW REFRIGERANT | FLOW REFRIGERANT | PREVENT REFRIGERANT | FLOW REFRIGERANT |
| A2A VALVE | OFF | OFF | ON | OFF | OFF |
| SECOND EXPANSION VALVE | OPEN | OPEN | OPEN | CLOSE | OPEN |

FIG. 10

| OPERATION MODE | COOLING (REVERSE DIRECTION) | | HEATING (FORWARD DIRECTION) | | A2A TERMINATION |
|---|---|---|---|---|---|
| | A2A IN OPERATION | A2W IN OPERATION | A2A IN OPERATION | A2W IN OPERATION | |
| REFRIGERANT FLOW | FLOW REFRIGERANT | FLOW REFRIGERANT | FLOW REFRIGERANT | PREVENT REFRIGERANT | FLOW REFRIGERANT → PREVENT REFRIGERANT |
| A2A VALVE | OFF | OFF | ON | OFF | OFF |
| SECOND EXPANSION VALVE | OPEN | OPEN | OPEN | CLOSE | OPEN → CLOSE |

AIR CONDITIONING SYSTEM AND METHOD OF CONTROLLING THE SAME

CROSS-REFERENCE TO RELATED APPLICATIONS

This application is a 371 of International Application No. PCT/KR2018/003269 filed on Mar. 21, 2018, which claims priority to Korean Patent Application No. 10-2017-0053028 filed on Apr. 25, 2017, the disclosures of which are herein incorporated by reference in their entirety.

BACKGROUND

1. Field

The present disclosure relates to a heat pump type air conditioning system and a method of controlling the same.

2. Description of Related Art

Generally, although heat naturally moves from a high temperature region to a low temperature region, moving heat from a low temperature region to a high temperature region may require certain external action. This is the principle of a heat pump. The heat pump is configured to perform an air-to-air and an air-to-water by use of heat generated and collected during a circulation process of compression, condensation, and evaporation of a refrigerant.

A multi type cooling/heating apparatus (hereinafter referred to as an air conditioning system) using a heat pump type includes an outdoor unit, an indoor unit, and a hydro unit. The air conditioning system uses heat of the heat pump for heating an indoor floor or for cooling/heating indoor air.

The air conditioning system includes an air to air mode (hereinafter referred to as an A2A mode) for cooling or heating the indoor space using the indoor unit, and an air to water mode (hereinafter referred to as an A2W mode) for cooling or heating the indoor space using the hydro unit. The A2A mode may perform convection cooling/heating that cools or heats indoor air using movement of heat generated during evaporation and condensation of the refrigerant through a pipe connecting the outdoor unit and the indoor unit (hereinafter referred to as an A2A indoor unit). The A2W mode may perform radiation cooling/heating that cools or heats indoor air using movement of heat generated during evaporation and condensation of the refrigerant through the pipe connecting the outdoor unit and the hydro unit (hereinafter referred to as an A2W indoor unit).

The air conditioning system may simultaneously carry out a cooling/heating operation of the A2A indoor unit and the cooling/heating operation of the A2W indoor unit by applying a Time Division Multi (TDM) control using time division. In the air conditioning system, the A2A indoor unit and the A2W indoor unit are installed in the same capacity as the outdoor unit, and respond to a load by alternating operation. The air conditioning system operates primarily on A2A indoor unit, which has a fast reaction speed. That is, the A2A indoor unit having relatively fast performance is preferentially operated to satisfy an occupant first, and the A2W indoor unit having relatively slow performance is sequentially operated to change the operation naturally from the convection cooling/heating to the radiation cooling/heating.

However, in the case of a heating operation of the A2W indoor unit, an electronic expansion valve connected to a stationary A2A indoor unit is opened at a minimum opening degree (a basic control specification of the air conditioning system to prevent accumulation of a liquid refrigerant). As a result, there is a phenomenon that heating performance is lowered because the amount of the refrigerant directed to an operating A2W indoor unit is insufficient.

SUMMARY

The present disclosure is directed to providing an air conditioning system capable of securing heating performance by preventing the inflow of a refrigerant into an A2A indoor unit during a heating operation of an A2W indoor unit, and a method of controlling the same.

One aspect of the present disclosure provides an air conditioning system including: an outdoor unit having a compressor and a first heat exchanger; a first indoor unit having a second heat exchanger and a second expansion valve, configured to perform a cooling/heating operation through heat exchange between a refrigerant and air; a second indoor unit having a third heat exchanger and a third expansion valve, configured to perform the cooling/heating operation through heat exchange between the refrigerant and water; an air to air (A2A) valve installed in a refrigerant pipe connecting the outdoor unit and the first indoor unit, configured to change a refrigerant cycle formed between the outdoor unit and the first indoor unit and the second indoor unit; and a controller configured to control the A2A valve according to an operation mode of the first indoor unit and the second indoor unit to prevent refrigerant bypass to a stationary indoor unit.

The controller may control an operation of the second expansion valve and the third expansion valve according to the operation mode of the first indoor unit and the second indoor unit to prevent the refrigerant bypass to the stationary indoor unit.

During a heating operation of the second indoor unit, the controller may control the A2A valve to block the refrigerant pipe connecting the outdoor unit and the first indoor unit.

During the heating operation of the second indoor unit, the controller may operate the second expansion valve in conjunction with the A2A valve to prevent flow of the refrigerant flowing into the first indoor unit.

During a single heating operation of the first indoor unit, the controller may turn on the A2A valve and close the third expansion valve to construct a refrigerant cycle in which the refrigerant flows into the first indoor unit.

During a single heating operation of the second indoor unit, the controller may turn off the A2A valve and close the second expansion valve to construct a refrigerant cycle in which the refrigerant flows into the second indoor unit.

When the first indoor unit and the second indoor unit are operated simultaneously, the controller may turn off the A2A valve and open the second expansion valve and the third expansion valve to construct a refrigerant cycle in which the refrigerant flows into the first indoor unit and the second indoor unit.

When the first indoor unit and the second indoor unit are operated simultaneously, the controller may alternately operate the first indoor unit and the second indoor unit sequentially.

The first indoor unit may be an air to air (A2A) indoor unit that performs a convection cooling/heating operation in an A2A mode by heat exchanging the refrigerant with the air through the second heat exchanger.

The second indoor unit may be an air to water (A2W) indoor unit that performs a radiation cooling/heating operation in an A2W mode by heat exchanging the refrigerant with the water through the third heat exchanger.

The outdoor unit may further include a flow path switching valve configured to switch flow of the refrigerant discharged from a compressor according to the operation mode of the first indoor unit and the second indoor unit.

Another aspect of the present disclosure provides an air conditioning system including: an outdoor unit installed on an outdoor side and having a compressor configured to compress a refrigerant; a first indoor unit connected to the outdoor unit and having a second heat exchanger configured to heat exchange the refrigerant with air, and a second expansion valve configured to expand the refrigerant; a second indoor unit connected to the outdoor unit and having a third heat exchanger configured to heat exchange the refrigerant with water, and a third expansion valve configured to expand the refrigerant; an air to air (A2A) valve installed in a refrigerant pipe connecting the outdoor unit and the first indoor unit, configured to change a refrigerant cycle formed between the outdoor unit and the first and second indoor units; and a controller configured to control the A2A valve and an expansion valve of an indoor unit in operation according to an operation mode of the first indoor unit and the second indoor unit to prevent bypass of the refrigerant flowing into a stationary indoor unit.

Another aspect of the disclosure provides a method of controlling an air conditioning system including an outdoor unit having a compressor, a first indoor unit having a second heat exchanger and a second expansion valve, configured to heat exchange a refrigerant with air, and a second indoor unit having a third heat exchanger and a third expansion valve, configured to heat exchange the refrigerant with water, the method including: determining whether the second indoor unit is in a heating operation; when the second indoor unit is the heating operation, controlling an air to air (A2A) valve connecting the outdoor unit and the first indoor unit to block a refrigerant pipe connecting the outdoor unit and the first indoor unit; operating the second expansion valve in conjunction with the A2A valve to prevent flow of the refrigerant flowing into the first indoor unit; and operating the third expansion valve to construct a refrigerant cycle in which the refrigerant flows into the second indoor unit to perform the heating operation of the second indoor unit.

The method may further include: determining whether the first indoor unit is in the heating operation; when the first indoor unit is in the heating operation, controlling the A2A valve to connect the outdoor unit and the first indoor unit; and operating the second expansion valve to construct the refrigerant cycle in which the refrigerant flows into the first indoor unit to perform the heating operation of the first indoor unit.

The method may further include: controlling the A2A valve according to an operation mode of the first indoor unit and the second indoor unit to prevent refrigerant bypass to a stationary indoor unit.

The method may further include: controlling the second expansion valve and the third expansion valve according to an operation mode of the first indoor unit and the second indoor unit to prevent refrigerant bypass to a stationary indoor unit.

The method may further include: determining whether the first indoor unit and the second indoor unit are operated simultaneously; and when the first indoor unit and the second indoor unit are operated simultaneously, opening the second expansion valve and the third expansion valve to construct the refrigerant cycle in which the refrigerant flows into the first indoor unit and the second indoor unit.

The method may further include: when the first indoor unit and the second indoor unit are operated simultaneously, alternately operating the first indoor unit and the second indoor unit sequentially.

According to the above-described air conditioning system and the method of controlling the same, during the heating operation of the A2W indoor unit, the A2A valve that connects the outdoor unit to the A2A indoor unit is closed to prevent the inflow of the refrigerant into the A2A indoor unit, so it is possible to prevent performance degradation by improving performance loss due to refrigerant bypass to a stationary A2A indoor unit. In addition, in order to improve the deterioration of the performance, the system itself can cope with a control algorithm without any additional hardware configuration, thereby minimizing the installation cost.

BRIEF DESCRIPTION OF THE DRAWINGS

FIG. 4 is a view illustrating operation states of an A2A valve and a second expansion valve in the refrigerant cycle illustrated in FIG. 3.

FIG. 7 is a view illustrating operation states of an A2A valve and a second expansion valve in the refrigerant cycle illustrated in FIG. 6.

FIG. 10 is a view illustrating operation states of an A2A valve and a second expansion valve in the refrigerant cycle illustrated in FIG. 9.

DETAILED DESCRIPTION

Figure 1:
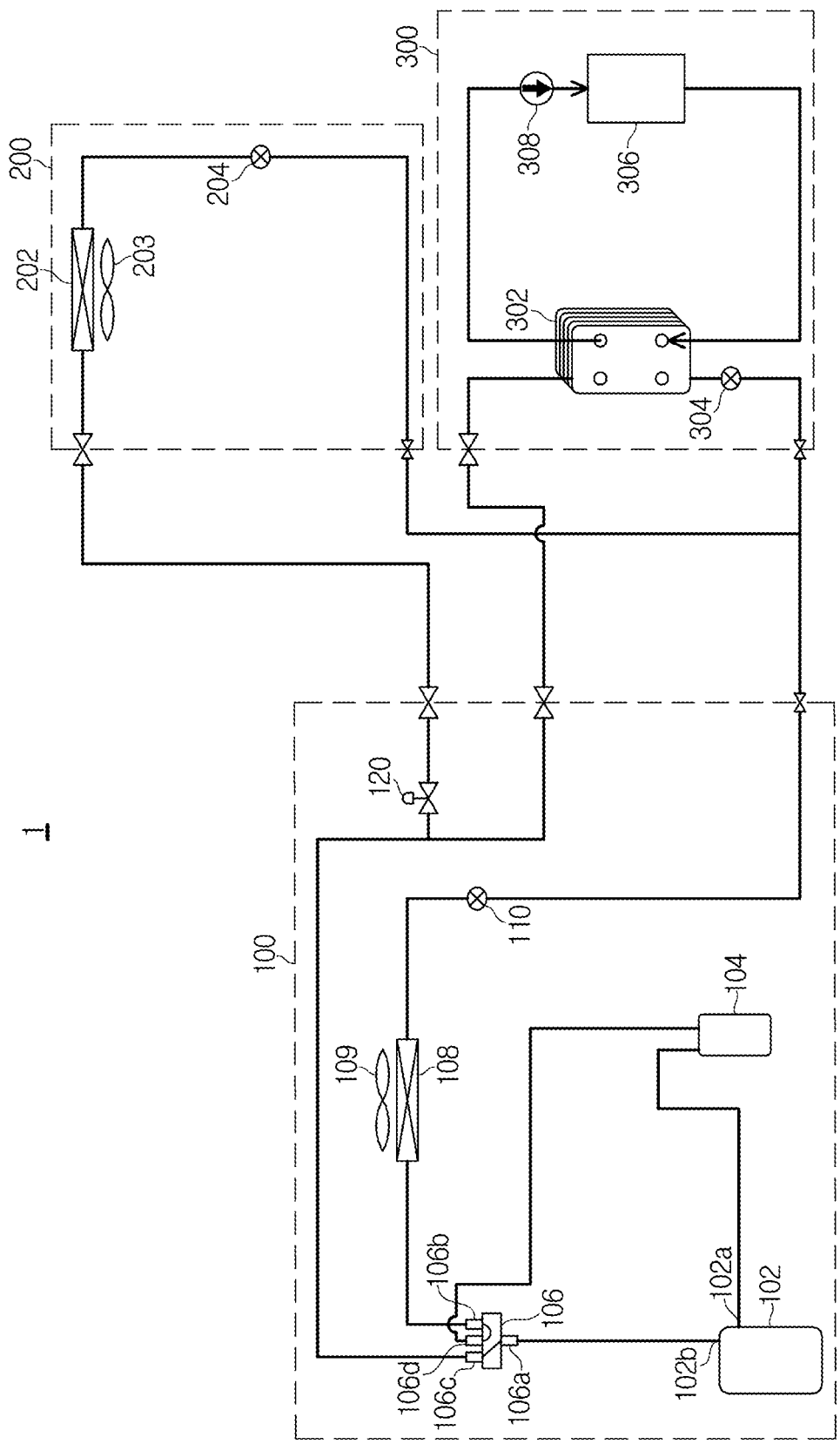
FIG. 1 is a conceptual diagram illustrating an air conditioning system according to embodiments of the disclosure.

Reference will now be made in detail to the embodiments of the disclosure, examples of which are illustrated in the accompanying drawings, wherein like reference numerals refer to like elements throughout.

The terms used in the present application are merely used to describe specific embodiments and are not intended to limit the disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the disclosure, the terms "first" and "second" may be used to describe various components, but the components are not limited by the terms. The terms may be used to distinguish one component from another component. For example, a first component may be called a second component and a second component may be called a first component without departing from the scope of the disclosure. The term "and/or" may include a combination of a plurality of items or any one of a plurality of items.

Embodiments of the disclosure will now be described with reference to the accompanying drawings.

FIG. 1 is a conceptual diagram illustrating an air conditioning system according to embodiments of the disclosure.

Referring to FIG. 1, an air conditioning system 1 may include an outdoor unit 100, an indoor unit 200, and a hydro unit 300. The outdoor unit 100, the indoor unit 200, and the hydro unit 300 may be coupled to each other through a refrigerant pipe, resulting in formation of a cycle. That is, the outdoor unit 100 is configured with the refrigerant pipe (gas pipe) connected to the indoor unit 200 and the hydro unit 300, respectively.

The outdoor unit 100 may include a compressor 102, an accumulator 104, a flow path switching valve 106, an outdoor heat exchanger 108, a first expansion valve 110, and a solenoid valve 112.

The compressor 102 may form high-temperature high-pressure refrigerant by compressing low-temperature low-pressure refrigerant suctioned through an inlet 102a, and may discharge the high-temperature high-pressure refrigerant to the outside through an outlet 102b. The compressor 102 may include an inverter compressor in which compression capacity is changed according to an input frequency, or a plurality of constant-speed compressors having a fixed compression capacity. The inlet 102a of the compressor 102 is connected to the accumulator 104. The outlet 102b of the compressor 102 is connected to the flow path switching valve 106. The flow path switching valve 106 is also connected to the accumulator 104.

The accumulator 104 may be installed between the inlet 102a of the compressor 102 and the flow path switching valve 106. When the condensed liquid refrigerant flows through the flow path switching valve 106, the accumulator 104 may temporarily store the mixture of oil and the refrigerant, separate the non-vaporized liquid refrigerant and prevent the liquid refrigerant from being suctioned into the compressor 102, thereby preventing the compressor 102 from being damaged. A gas refrigerant separated in the accumulator 104 may be suctioned into the inlet 102a of the compressor 102.

The flow path switching valve 106 may be constructed as a 4-way valve to switch flow of refrigerant discharged from the compressor 102 according to an operation mode (cooling or heating), resulting in formation of a refrigerant flow path needed to perform the corresponding operation mode. The flow path switching valve 106 may include a first port 106a connected to the outlet 102b of the compressor 100, a second port 106b connected to the outdoor heat exchanger 108, a third port 106c connected to the indoor unit 200 or the hydro unit 300, and a fourth port 106d connected to the accumulator 104 which is the inlet 102a of the compressor 100.

During a cooling mode, the outdoor heat exchanger 108 may operate as a condenser. During a heating mode, the outdoor heat exchanger 108 may operate as an evaporator. The first expansion valve 110 may be connected to one side of the outdoor heat exchanger 108. The outdoor heat exchanger 108 may include an outdoor fan 109 configured to increase the efficiency of heat exchange between the refrigerant and outdoor air.

The first expansion valve 110 may be implemented as an electronic expansion valve. The first expansion valve 110 may expand the refrigerant, may adjust a flow rate of the refrigerant, and may prevent flow of the refrigerant, as needed. The first expansion valve 110 may be replaced with the other expansion valve configured to perform the above-mentioned function.

The solenoid valve 112 may include an A2A heating valve (hereinafter referred to as an A2A valve) installed in the refrigerant pipe connecting the outdoor unit 100 and the indoor unit 200. The solenoid valve 112 allows the refrigerant flow path formed between the outdoor unit 100 and the indoor unit 200 to be changed.

The A2A valve 112 may be configured as a refrigerant flow path changing valve that can control flow of the refrigerant in one direction (forward direction) and is opened in the other direction (reverse direction), and may prevent flow of the refrigerant flowing in one direction (forward direction), if necessary.

The A2A valve 112 is not limited to a one-way valve, through which the refrigerant flows only in one direction. The A2A valve 112 may also be used as the one-way valve by closing unneeded ports of valves with multiple ports, such as a two-way valve, a three-way valve, or a flow path switching valve.

The A2A valve 112 may be turned off during the heating operation of the hydro unit 300 to prevent flow of the refrigerant flowing into the indoor unit 200. When the A2A valve 112 is turned off, the cycle in which the refrigerant flow path between the outdoor unit 100 and the indoor unit 200 is blocked may be constituted.

In this way, during the heating operation of the hydro unit 300, the A2A valve 112 is turned off to prevent the liquid refrigerant from being accumulated in the indoor heat exchanger 202 of the stationary indoor unit 200, thereby improving performance loss due to refrigerant bypass to the indoor unit 200 so as to prevent deterioration of heating performance.

The indoor unit 200 may be an apparatus for cooling/heating indoor air of the indoor space through heat exchange between the refrigerant and the air. The indoor unit 200 may include an indoor heat exchanger 202 and a second expansion valve 204. If necessary, two or more indoor units 200 may also be installed.

The indoor heat exchanger 202 may operate as the evaporator in the cooling mode, and may operate as the condenser in the heating mode. The second expansion valve 204 may be connected to one side of the indoor heat exchanger 202. The indoor heat exchanger 202 may include an indoor fan 203 configured to increase the efficiency of heat exchange between the refrigerant and indoor air.

The second expansion valve 204 may be implemented as the electronic expansion valve. The second expansion valve 204 may expand the refrigerant, may adjust the flow rate of the refrigerant, and may prevent flow of the refrigerant as needed. The second expansion valve 204 may be replaced with the other expansion valve configured to perform the above-mentioned function.

The hydro unit 300 may heat/cool water through heat exchange between the refrigerant and water so that the heated/cooled water is used for heating/cooling. The hydro unit 300 may include an A2W heat exchanger 302 and a third expansion valve 304.

Refrigerant heat exchange plates, through which the refrigerant flows, and water heat exchange plates, through which water flows, are alternately arranged in the A2W heat exchanger 302. Cold water/hot water is generated through heat exchange between the refrigerant heat exchange plates and the water heat exchange plates. The refrigerant, compressed by the compressor 102, may be directly supplied to the A2W heat exchanger 302, or the refrigerant, having passed through the outdoor unit 100 or the indoor unit 200, may be supplied to the A2W heat exchanger 302. The cold water/hot water generated by the hydro unit 300 is supplied to a water supply tank, a fan coil unit, and floor cooling/heating device so that the cold water/hot water is used for cold water/hot water supply and cooling/heating.

The third expansion valve 304 may be implemented as the electronic expansion valve. The third expansion valve 304 may expand the refrigerant, may adjust the flow rate of the refrigerant, and may prevent flow of the refrigerant, as needed. The third expansion valve 304 may be replaced with the other expansion valve configured to perform the above-mentioned function.

The hydro unit 300 may further include a water supply tank 306 and a water supply pump 308 to supply water to the A2W heat exchanger 302 and to receive the water/hot water generated through heat exchange in the A2W heat exchanger 302.

Figure 2:
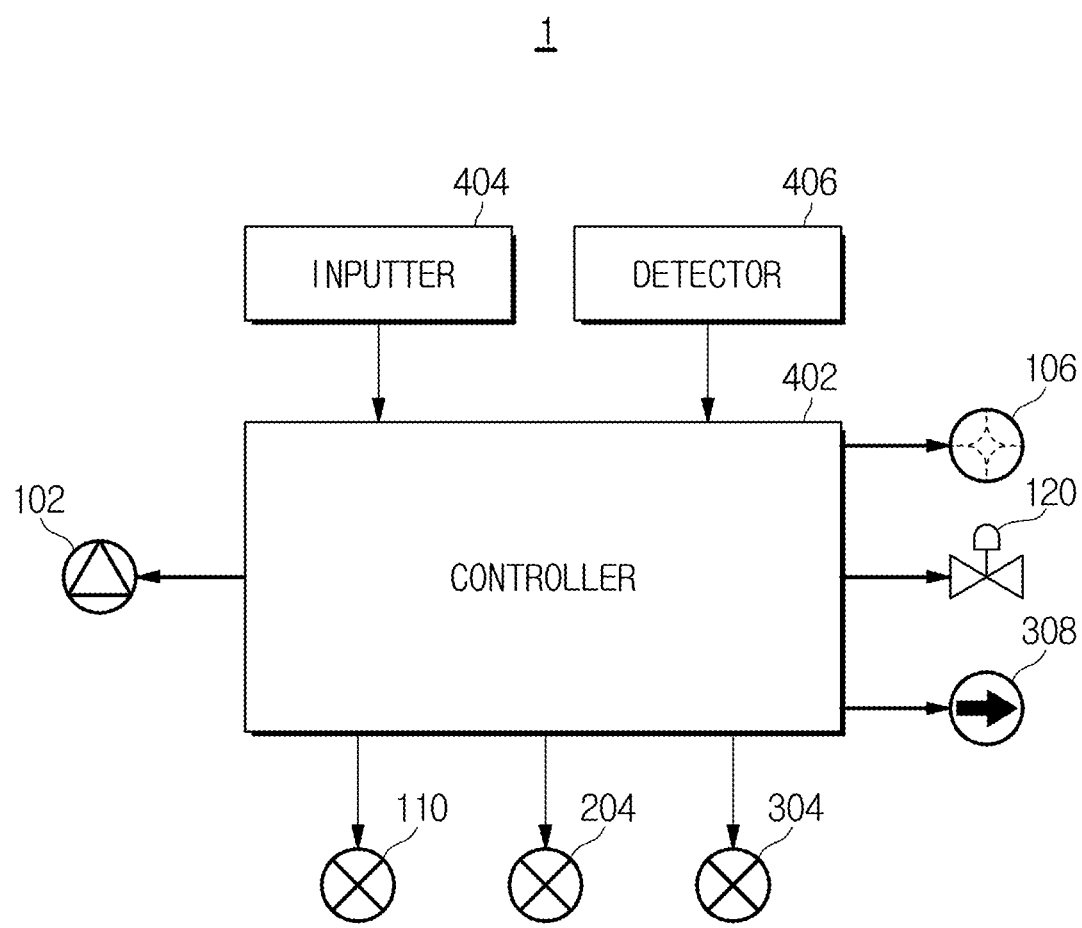
FIG. 2 is a control system diagram of the air conditioning system illustrated in FIG. 1.

FIG. 2 is a control system diagram of the air conditioning system illustrated in FIG. 1.

Referring to FIG. 2, the air conditioning system 1 may include not only the constituent elements illustrated in FIG. 1, but also a controller 402, a detector 404, and an inputter 406.

The controller 402 may be a microprocessor for controlling overall operation of the air conditioning system 1. The controller 402 may receive various kinds of operation information and temperature information from the inputter 404 and the detector 406, and may control the compressor 102, the flow path switching valve 106, the first expansion valve 110, the A2A valve 120, the second expansion valve 204, the third expansion valve 304, and the water supply pump 308 on the basis of the received information.

The inputter 404 may be a remote control device for wirelessly transmitting a control command for selecting an operation of the indoor unit 200 or the hydro unit 300, and may select any one of a convection cooling/heating (A2A cooling/heating) mode, a radiation cooling/heating (A2W cooling/heating) mode, and the cold water/hot water.

The inputter 404 may include a mobile phone (e.g., a cellular phone or a PCS phone), a smartphone, a personal digital assistant (PDA), a Portable Multimedia Player (PMP), a laptop computer, a digital broadcasting terminal, a netbook, a tablet PC, a navigation system, etc.

In addition, the inputter 404 may be a general simplified remote-controller. The remote-controller may generally communicate with the indoor unit 200 or the hydro unit 300 using infrared Data Association (IrDA).

The inputter 404 may transmit and receive radio frequency (RF) signals to and from the indoor unit 200 or the hydro unit 300 using various communication schemes, for example, Radio Frequency (RF), Wi-Fi, Bluetooth, ZigBee, Near Field Communication (NFC), Ultra Wide Band (UWB), etc. It should be noted that any one of the above communication schemes through which the inputter 404 transmits and receives RF signals to and from the indoor unit 200 or the hydro unit 300 through wireless communication can be applied to the disclosure without departing from the scope or spirit of the disclosure.

The inputter 404 may include an operation/stop button to turn on or off the indoor unit 200 or the hydro unit 300, an operation selection button to select an operation mode of the indoor unit 200 or the hydro unit 300, a wind-direction button to control the direction of airflow, an air-volume button to control the intensity of airflow, a temperature button to adjust a temperature, a dial button, etc.

The detector 406 may detect the temperature of the indoor space, and may output the detected temperature to the controller 404.

The air conditioning system 1 according to the embodiment may perform a heating mode operation and a cooling mode operation according to the control of the controller 402.

In the embodiment, an A2A mode is a cooling/heating mode using the indoor unit 200. In the A2A mode, the convection cooling/heating is performed through heat exchange between the refrigerant and air in the indoor heat exchanger 202 of the indoor unit 200 (hereinafter referred to as the A2A indoor unit).

Also, an A2W mode is the cooling/heating mode using the hydro unit 300. In the A2W mode, the radiation cooling/heating is performed through heat exchange between the refrigerant and water in the A2W heat exchanger 302 of the hydro unit 300 (hereinafter referred to as the A2W indoor unit). In the A2W mode, heat exchange may be performed between air and the water having been heat-exchanged with the refrigerant to perform the cooling/heating.

When it is determined that the operation condition is any one of the A2A indoor unit 200 or the A2W indoor unit 300, the air conditioning system 1 may operate the A2A indoor unit 200 or the A2W indoor unit 300 at an output of 100%. At this time, the capacities of the A2A indoor unit 200 and the A2W indoor unit 300 are the same as the capacity of the outdoor unit 100. Also, depending on design specifications, the sum of the total capacities of the A2A indoor unit 200 and the A2W indoor unit 300 may be between 50% and 130% of the capacity of the outdoor unit 100. It is possible to design variously with different specifications.

The air conditioning system 1 may alternately operate the cooling/heating operation of the A2A indoor unit 200 and the cooling/heating operation of the A2W indoor unit 300 by applying a Time Division Multi (TDM) control using time division. That is, when a simultaneous operation of the A2A indoor unit 200 and the A2W indoor unit 300 is requested, the A2A indoor unit 200 having relatively fast performance is preferentially operated to satisfy an occupant first, and the A2W indoor unit 300 having relatively slow performance is alternately operated in sequence to change the operation naturally from the convection cooling/heating to the radiation cooling/heating. It is needless to say that the A2W indoor unit 200 is preferentially operated to enhance the comfort of the occupant, and the A2W indoor unit 300 can be operated the A2W indoor unit 300 may be preferentially operated in response to a user's request First, a refrigerant cycle and a control algorithm of the air conditioning system 1 when the simultaneous operation of the A2A indoor unit 200 and the A2W indoor unit 300 is requested will be described with reference to FIGS. 3 to 5.

Figure 3:
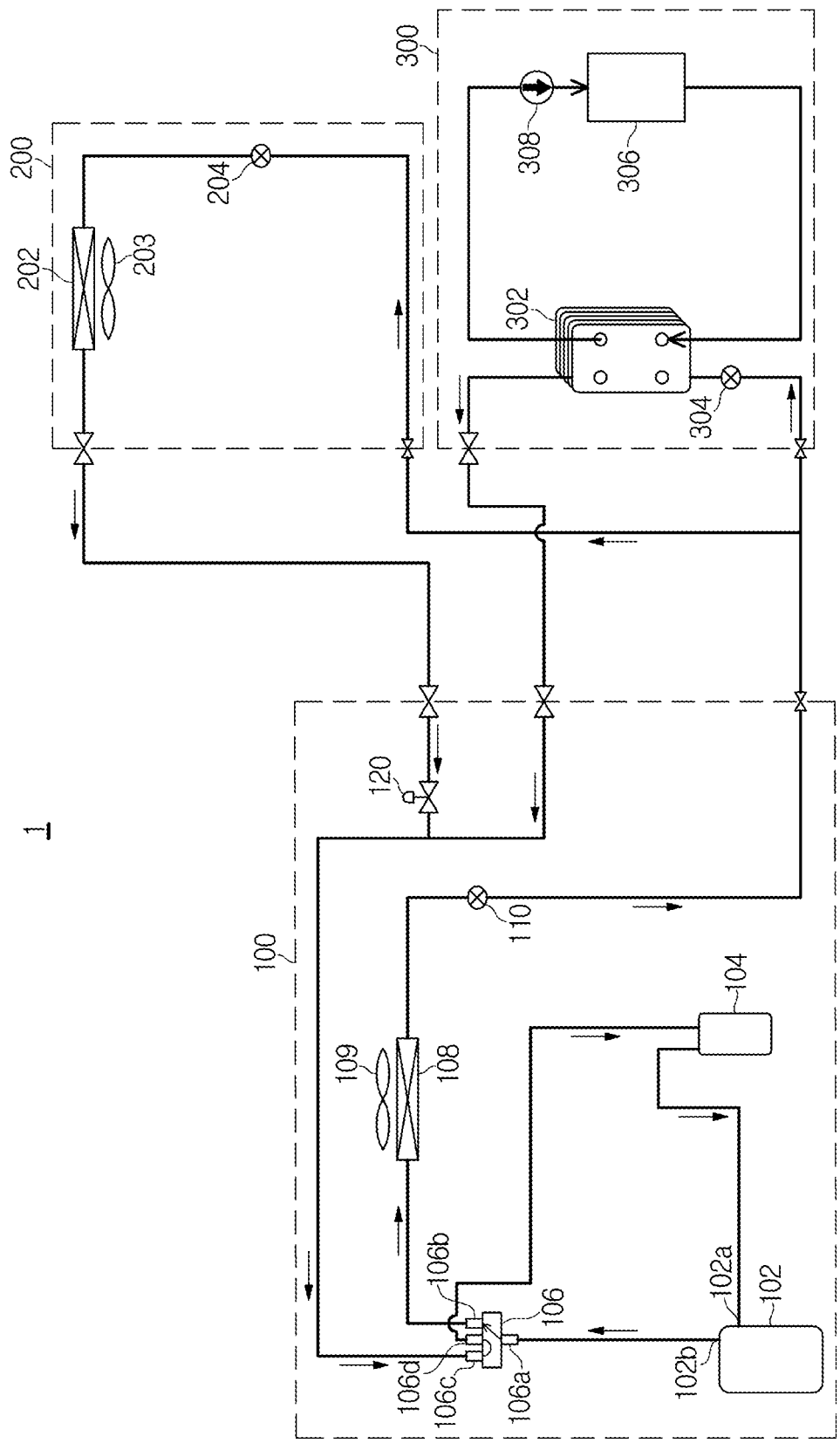
FIG. 3 is a conceptual diagram illustrating a refrigerant cycle during a simultaneous cooling operation of an A2A indoor unit and an A2W indoor unit in the air conditioning system illustrated in FIG. 1.

FIG. 3 is a conceptual diagram illustrating a refrigerant cycle during a simultaneous cooling operation of an A2A indoor unit and an A2W indoor unit in the air conditioning system illustrated in FIG. 1.

Referring to FIG. 3, the air conditioning system 1 may construct the refrigerant cycle in a simultaneous cooling operation mode in which the cooling operation mode of the A2A indoor unit 200 and the cooling operation mode of the A2W indoor unit 300 are simultaneously required.

By operating the flow path switching valve 106, the controller 402 may form the refrigerant flow path in which the first port 106a is connected to the second port 106b and the third port 106c is connected to the fourth port 106d.

The controller 402 may turn off the A2A valve 120 and open the second expansion valve 204 of the A2A indoor unit 200, and may thus control the refrigerant to flow into the A2A indoor unit 200.

In addition, the controller 402 may open the third expansion valve 304, and may thus control the refrigerant to flow into the A2W indoor unit 300.

Therefore, the refrigerant discharged from the compressor 102 may flow into the A2A indoor unit 200 and the A2W indoor unit 300 after passing through the flow path switching valve 106 and the outdoor heat exchanger 108. In this case, the outdoor heat exchanger 108 may operate as the condenser.

The refrigerant flowing in the A2A indoor unit 200 may flow into the A2A valve 120 through the second expansion valve 204 and the indoor heat exchanger 202. In this case, the indoor heat exchanger 202 may operate as the evaporator. The refrigerant flowing in the A2A valve 120 may be suctioned into the compressor 102 after passing through the flow path switching valve 106.

The refrigerant flowing in the A2W indoor unit 300 after passing through the third expansion valve 304 and the A2W heat exchanger 302 and the refrigerant flowing in the A2W heat exchanger 302 may be suctioned into the compressor 102 after passing through the flow path switching valve 106.

Therefore, the air conditioning system 1 may construct the refrigerant cycle in which the refrigerant sequentially circulates the compressor 102→the flow path switching valve 106→the outdoor heat exchanger 108→the second expansion valve 204 of the A2A indoor unit 200→the indoor heat exchanger 202→the A2A valve 120→the flow path switching valve 106→the accumulator 104→the compressor 102, resulting in implementation of the cooling operation of the A2A indoor unit 200.

The air conditioning system 1 may construct the refrigerant cycle in which the refrigerant sequentially circulates the compressor 102→the flow path switching valve 106→the outdoor heat exchanger 108→the third expansion valve 304 of the A2W indoor unit 300→the A2W heat exchanger 302→the flow path switching valve 106→the accumulator 104→the compressor 102, resulting in implementation of the cooling operation of the A2W indoor unit 300.

During the cooling operation of the A2W indoor unit 300, the second expansion valve 204 of the A2A indoor unit 200 may be switched from an OPEN state to a CLOSE state. When the second expansion valve 204 is closed, flow of the refrigerant flowing into the indoor heat exchanger 202 may be prevented. Therefore, the refrigerant discharged from the compressor 102 flows only to the A2W indoor unit 300 through the outdoor heat exchanger 108, so that the cooling performance of the A2W indoor unit 300 may be maximized.

FIG. 4 is a view illustrating operation states of an A2A valve and a second expansion valve in the refrigerant cycle illustrated in FIG. 3.

Referring to FIG. 4, during the cooling operation of the A2A indoor unit 200, the A2A valve 120 may be turned off and the second expansion valve 204 of the A2A indoor unit 200 may be opened to construct the cycle such that the refrigerant flows into the A2A indoor unit 200. Accordingly, the A2A indoor unit 200 may perform the convection cooling operation through heat exchange between the refrigerant and the air in the indoor heat exchanger 202.

During the cooling operation of the A2W indoor unit 300, the third expansion valve 304 of the A2W indoor unit 300 may be opened to construct the cycle such that the refrigerant flows into the A2W indoor unit 300. Accordingly, the A2W indoor unit 300 may perform the radiation cooling operation through heat exchange between the refrigerant and the water in the A2W heat exchanger 302. During the cooling operation of the A2W indoor unit 300, the second expansion valve 204 of the stationary A2A indoor unit 200 may be switched from the OPEN state to the CLOSE state. When the second expansion valve 204 is closed, flow of the refrigerant flowing in the indoor heat exchanger 202 may be prevented.

Figure 5:
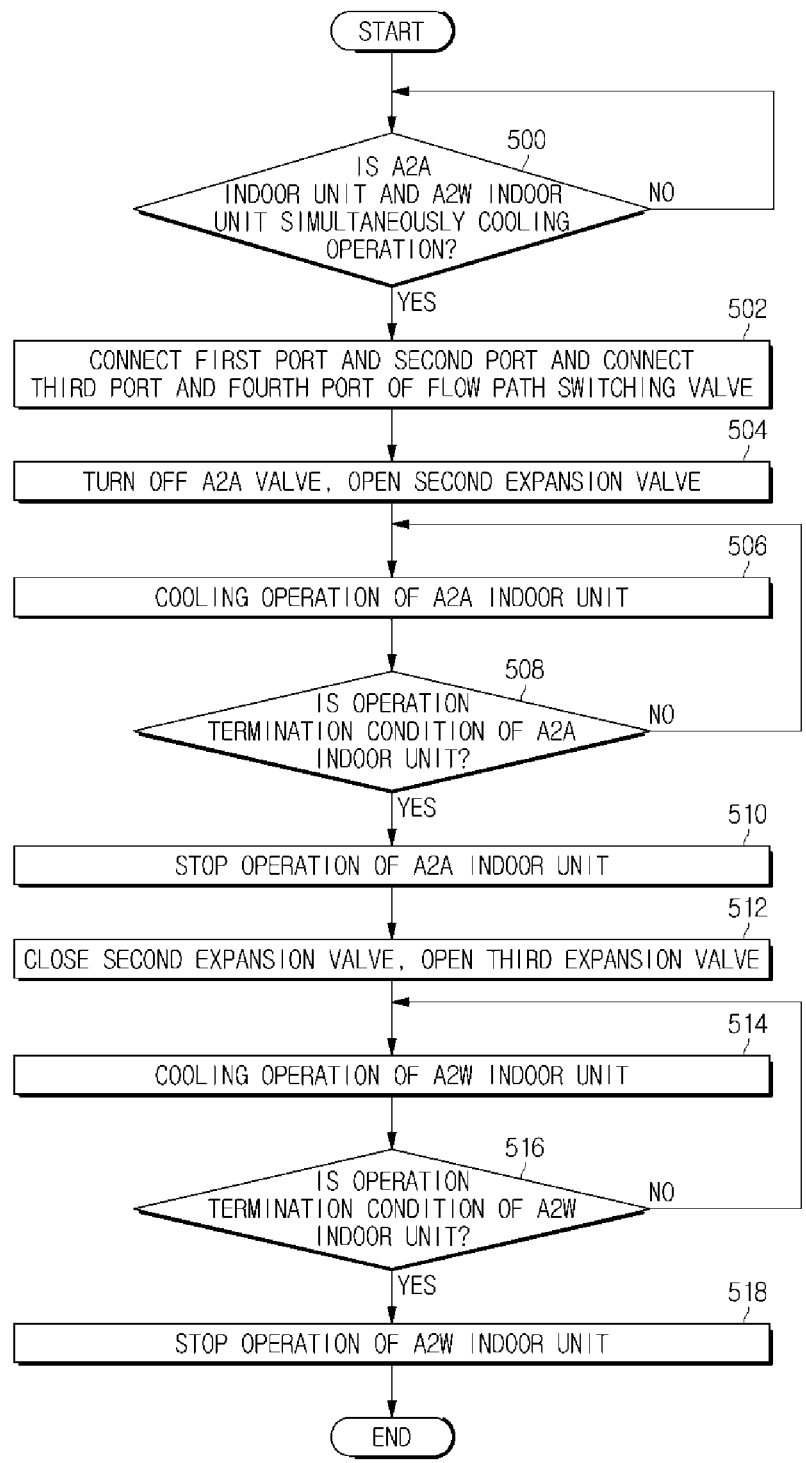
FIG. 5 is a flowchart illustrating a control algorithm of the refrigerant cycle illustrated in FIG. 3.

FIG. 5 is a flowchart illustrating a control algorithm of the refrigerant cycle illustrated in FIG. 3.

Referring to FIG. 5, the user operates the inputter 404 to set the operation information such as the operation mode (e.g., simultaneous cooling operation) of the air conditioning system 1, a target temperature of the indoor space, and the like. The operation information set by the user through the inputter 404 may be transmitted to the controller 402.

Accordingly, the controller 402 may receive various kind of operation information from the inputter 404, and determine whether the A2A indoor unit 200 and the A2W indoor unit 300 are simultaneously cooling operation (500).

When it is the simultaneous cooling operation (500), the controller 402 may operate the flow path switching valve 106 to connect the first port 106a and the second port 106b of the flow path switching valve 106 and to connect the third port 106c and the fourth port 106d, and may construct the refrigerant cycle illustrated in FIG. 3 (502).

The controller 402 may turn off the A2A valve 120 and open the second expansion valve 204 of the A2A indoor unit 200, and may thus construct the refrigerant cycle so that the refrigerant discharged from the compressor 102 flows into the A2A indoor unit 200 (504).

When constructing the refrigerant cycle for the cooling operation of the A2A indoor unit 200, the controller 402 may control the operation of the A2A valve 120 and the second expansion valve 204 to operate with a predetermined time difference in conjunction with the compressor 102 and the flow path switching valve 106.

Therefore, the refrigerant cycle in which the refrigerant sequentially circulates the compressor 102→the flow path switching valve 106→the outdoor heat exchanger 108→the second expansion valve 204 of the A2A indoor unit 200→the indoor heat exchanger 202→the A2A valve 120→the flow path switching valve 106→the accumulator 104→the compressor 102 may be constructed, resulting in implementation of the cooling operation of the A2A indoor unit 200 (506).

When the temperature of the indoor space reaches the target temperature according to the cooling operation of the A2A indoor unit 200, the controller 402 may determine whether the condition is the operation termination condition of the A2A indoor unit 200 (508).

When the operation termination condition of the A2A indoor unit 200 is not satisfied (508), the controller 402 may return to operation 506 to continue the cooling operation of the A2A indoor unit 200.

On the other hand, when the operation termination condition of the A2A indoor unit 200 is satisfied (508), the controller 402 may stop the cooling operation of the A2A indoor unit 200 (510).

The controller 402 may switch the second expansion valve 204 of the A2A indoor unit 200 from the OPEN state to the CLOSE state and open the third expansion valve 304, and may thus construct the refrigerant cycle so that the refrigerant discharged from the compressor 102 flows into the A2W indoor unit 300 (512). When the second expansion valve 204 is closed, the refrigerant discharged from the compressor 102 flows only to the A2W indoor unit 300 through the outdoor heat exchanger 108, so that the cooling performance of the A2W indoor unit 300 may be maximized.

When constructing the refrigerant cycle for the cooling operation of the A2W indoor unit 300, the controller 402 may control the operation of the A2A valve 120 and the third expansion valve 304 to operate with the predetermined time difference in conjunction with the compressor 102 and the flow path switching valve 106.

Therefore, the refrigerant cycle in which the refrigerant sequentially circulates the compressor 102→the flow path switching valve 106→the outdoor heat exchanger 108→the third expansion valve 304 of the A2W indoor unit 300→the A2W heat exchanger 302→the flow path switching valve 106→the accumulator 104→the compressor 102 may be constructed, resulting in implementation of the cooling operation of the A2W indoor unit 300 (514).

When the temperature of the indoor space reaches the target temperature according to the cooling operation of the A2W indoor unit 300, the controller 402 may determine whether the condition is the operation termination condition of the A2W indoor unit 300 (516).

When the operation termination condition of the A2W indoor unit 300 is not satisfied (516), the controller 402 may return to operation 514 to continue the cooling operation of the A2W indoor unit 300.

On the other hand, when the operation termination condition of the A2W indoor unit 300 is satisfied (516), the controller 402 may stop the cooling operation of the A2W indoor unit 300 (518).

Next, the refrigerant cycle and the control algorithm of the air conditioning system 1 when a single heating operation of the A2A indoor unit 200 is requested will be described with reference to FIGS. 6 to 8.

Figure 6:
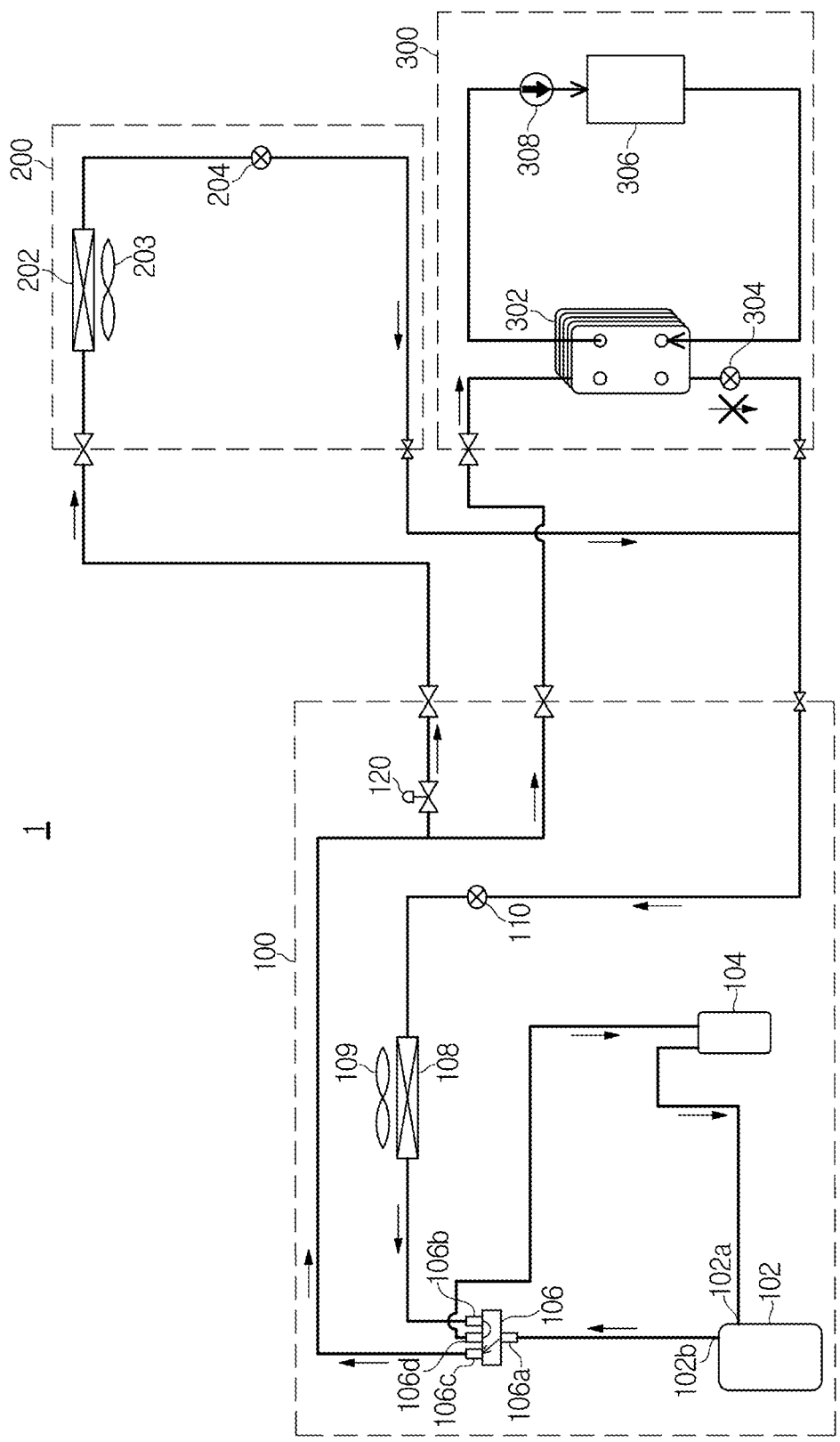
FIG. 6 is a conceptual diagram illustrating a refrigerant cycle during a heating operation of an A2A indoor unit in the air conditioning system illustrated in FIG. 1.

FIG. 6 is a conceptual diagram illustrating a refrigerant cycle during a heating operation of an A2A indoor unit in the air conditioning system illustrated in FIG. 1.

Referring to FIG. 6, the air conditioning system 1 may construct the refrigerant cycle in a single cooling operation mode of the A2A indoor unit 200.

By operating the flow path switching valve 106, the controller 402 may form the refrigerant flow path in which the first port 106a is connected to the second port 106b and the third port 106c is connected to the fourth port 106d.

The controller 402 may turn on the A2A valve 120 and open the second expansion valve 204 of the A2A indoor unit 200, and may thus control the refrigerant to flow into the A2A indoor unit 200.

Therefore, the refrigerant discharged from the compressor 102 may flow into the A2A indoor unit 200 after passing through the flow path switching valve 106 and the A2A valve 120.

The refrigerant flowing in the A2A indoor unit 200 may flow into the outdoor heat exchanger 108 through the indoor heat exchanger 202 and the second expansion valve 204. In this case, the indoor heat exchanger 202 may operate as the condenser, and the outdoor heat exchanger 1082 may operate as the evaporator. The refrigerant flowing in the outdoor heat exchanger 108 may be suctioned into the compressor 102 after passing through the flow path switching valve 106.

Therefore, the air conditioning system 1 may construct the refrigerant cycle in which the refrigerant sequentially circulates the compressor 102→the flow path switching valve 106→the A2A valve 120→the indoor heat exchanger 202→the second expansion valve 204 of the A2A indoor unit 200→the outdoor heat exchanger 108→the flow path switching valve 106→the accumulator 104→the compressor 102, resulting in implementation of the heating operation of the A2A indoor unit 200.

It is possible to add a control specification to make the A2A valve 120 open before a certain time before a starting of the compressor 102 so that there is no problem in the starting the compressor 102 during the heating operation of the A2A indoor unit 200.

FIG. 7 is a view illustrating operation states of an A2A valve and a second expansion valve in the refrigerant cycle illustrated in FIG. 6.

Referring to FIG. 7, during the heating operation of the A2A indoor unit 200, the A2A valve 120 may be turned on and the second expansion valve 204 of the A2A indoor unit 200 may be opened to construct the cycle such that the refrigerant flows into the A2A indoor unit 200. Accordingly, the A2A indoor unit 200 may perform the convection heating operation through heat exchange between the refrigerant and the air in the indoor heat exchanger 202.

When the convection heating operation is performed in the A2A indoor unit 200, the third expansion valve 304 of the A2W indoor unit 300 may be closed and the refrigerant does not flow into the A2W indoor unit 300. Therefore, the refrigerant discharged from the compressor 102 flows only to the A2A indoor unit 200, so that an A2A heating operation using the A2A indoor unit 200 may be performed independently.

Figure 8:
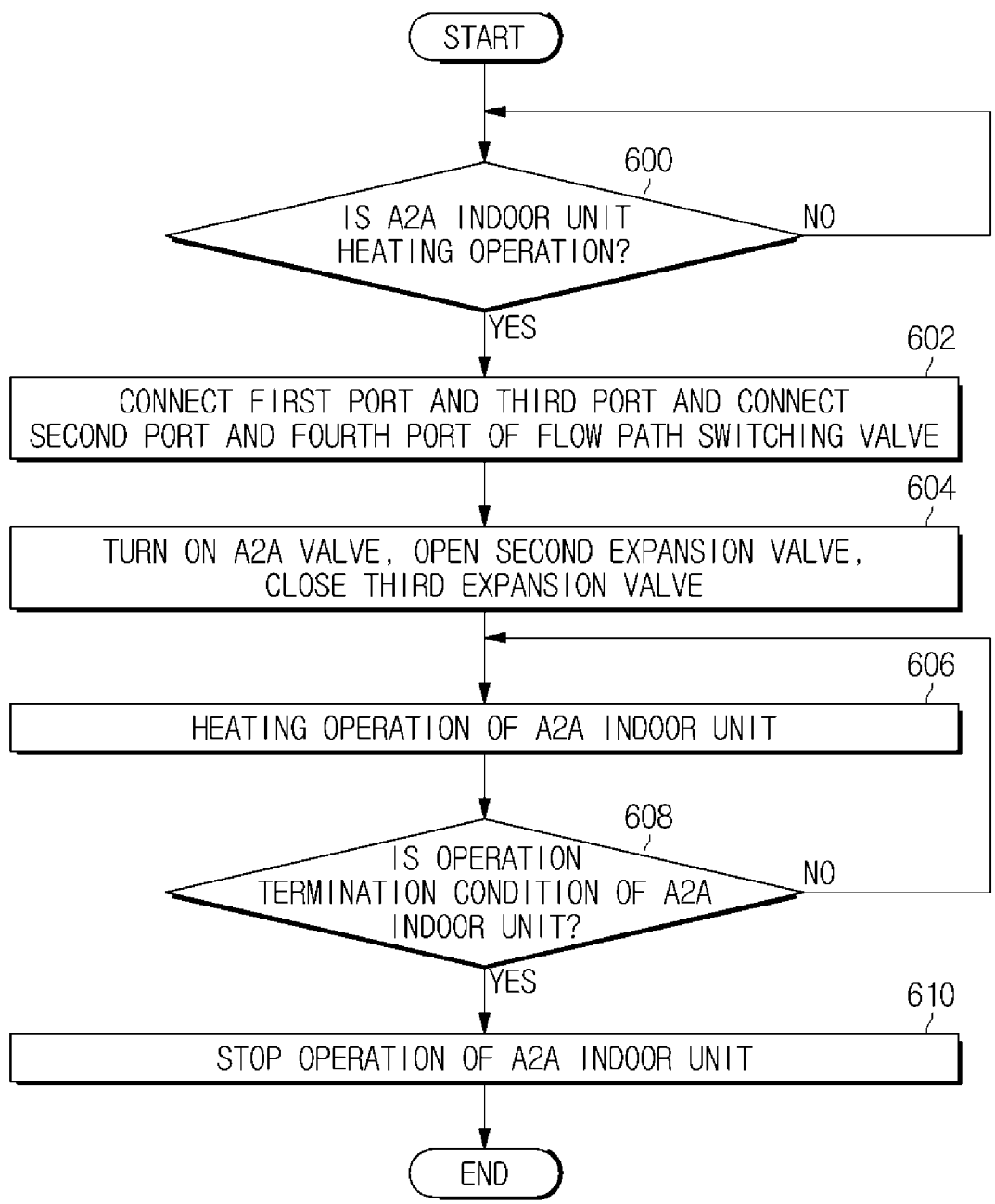
FIG. 8 is a flowchart illustrating a control algorithm of the refrigerant cycle illustrated in FIG. 6.

FIG. 8 is a flowchart illustrating a control algorithm of the refrigerant cycle illustrated in FIG. 6.

Referring to FIG. 8, the user operates the inputter 404 to set the operation information such as the operation mode (e.g., single heating operation of A2A indoor unit) of the air conditioning system 1, the target temperature of the indoor space, and the like. The operation information set by the user through the inputter 404 may be transmitted to the controller 402.

Accordingly, the controller 402 may receive various kind of operation information from the inputter 404, and determine whether the A2A indoor unit 200 is independently heating operation (600).

When it is the heating operation of the A2A indoor unit 200 (600), the controller 402 may operate the flow path switching valve 106 to connect the first port 106a and the third port 106c of the flow path switching valve 106 and to connect the second port 106b and the fourth port 106d, and may construct the refrigerant cycle illustrated in FIG. 6 (602).

The controller 402 may turn on the A2A valve 120, open the second expansion valve 204 of the A2A indoor unit 200 and close the third expansion valve 304 of the A2W indoor unit 300, and may thus construct the refrigerant cycle so that the refrigerant discharged from the compressor 102 flows only into the A2W indoor unit 300 (604).

When constructing the refrigerant cycle for the heating operation of the A2A indoor unit 200, the controller 402 may provide a predetermined delay time upon turning on the A2A valve 120, so as to prevent an impact sound generated due to sudden switching of the refrigerant path.

Therefore, the refrigerant cycle in which the refrigerant sequentially circulates the compressor 102→the flow path switching valve 106→the A2A valve 120→the indoor heat exchanger 202→the second expansion valve 204 of the A2A indoor unit 200→the outdoor heat exchanger 108→the flow path switching valve 106→the accumulator 104→the compressor 102 may be constructed, resulting in implementation of the heating operation of the A2A indoor unit 200 (606).

When the temperature of the indoor space reaches the target temperature according to the heating operation of the A2A indoor unit 200, the controller 402 may determine whether the condition is the operation termination condition of the A2A indoor unit 200 (608).

When the operation termination condition of the A2A indoor unit 200 is not satisfied (608), the controller 402 may return to operation 606 to continue the heating operation of the A2A indoor unit 200.

On the other hand, when the operation termination condition of the A2A indoor unit 200 is satisfied (608), the controller 402 may stop the heating operation of the A2A indoor unit 200 (610).

Next, the refrigerant cycle and the control algorithm of the air conditioning system 1 when a single heating operation of the A2W indoor unit 300 is requested will be described with reference to FIGS. 9 to 11.

Figure 9:
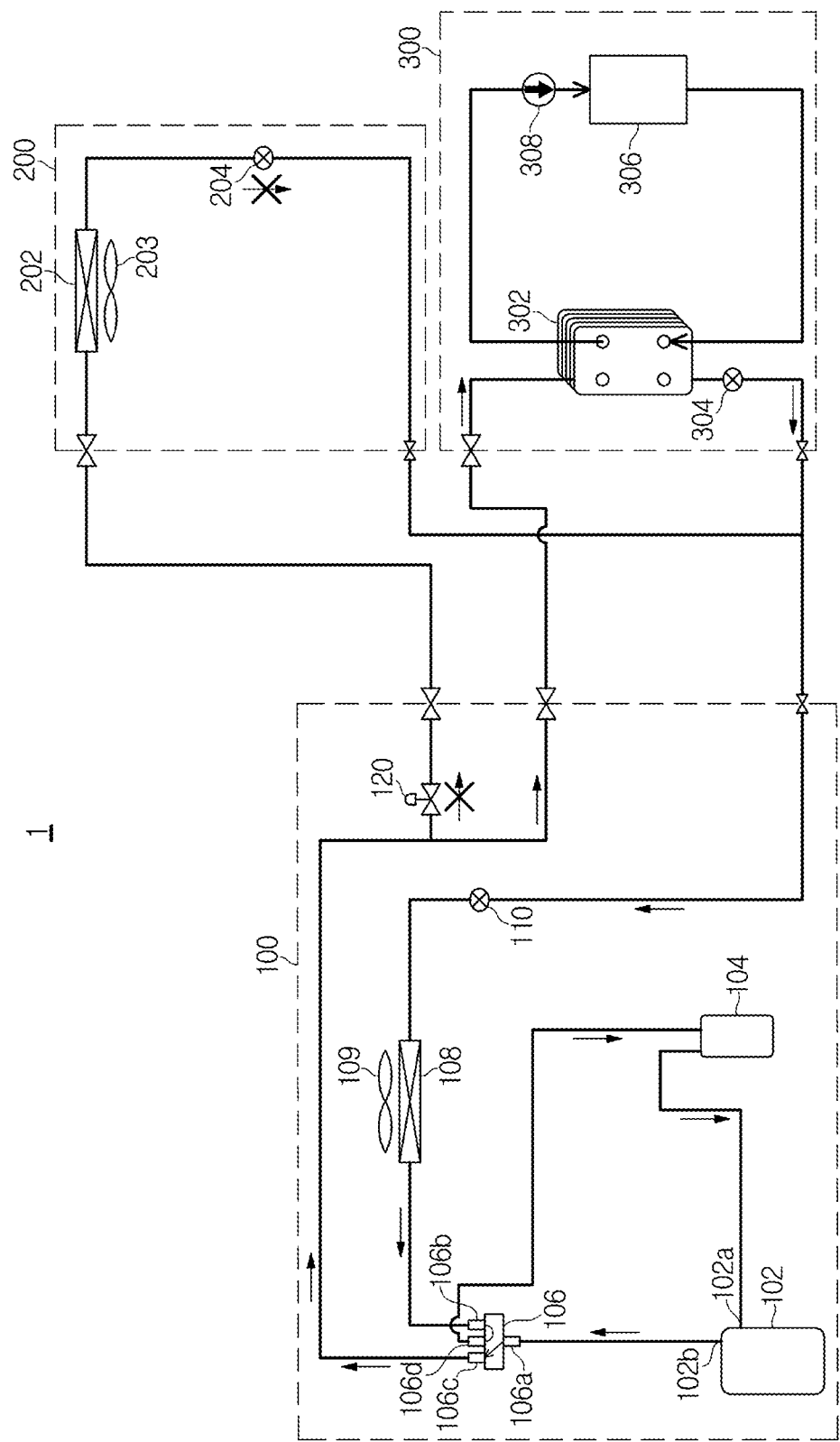
FIG. 9 is a conceptual diagram illustrating a refrigerant cycle during a heating operation of an A2W indoor unit in the air conditioning system illustrated in FIG. 1.

FIG. 9 is a conceptual diagram illustrating a refrigerant cycle during a heating operation of an A2W indoor unit in the air conditioning system illustrated in FIG. 1.

Referring to FIG. 9, the air conditioning system 1 may construct the refrigerant cycle in a single heating operation mode of the A2W indoor unit 300.

By operating the flow path switching valve 106, the controller 402 may form the refrigerant flow path in which the first port 106a is connected to the second port 106b and the third port 106c is connected to the fourth port 106d.

The controller 402 may turn off the A2A valve 120 and close the second expansion valve 204 of the A2A indoor unit 200, and may thus control the refrigerant to flow into the A2W indoor unit 300.

Therefore, the refrigerant discharged from the compressor 102 may flow into the A2W indoor unit 300 after passing through the flow path switching valve 106.

The refrigerant flowing in the A2W indoor unit 300 may flow into the outdoor heat exchanger 108 through the A2W heat exchanger 302 and the third expansion valve 304. The refrigerant flowing in the outdoor heat exchanger 108 may be suctioned into the compressor 102 after passing through the flow path switching valve 106.

Therefore, the air conditioning system 1 may construct the refrigerant cycle in which the refrigerant sequentially circulates the compressor 102→the flow path switching valve 106→the A2W heat exchanger 302→the third expansion valve 304 of the A2W indoor unit 300→the outdoor heat exchanger 108→the flow path switching valve 106→the accumulator 104→the compressor 102, resulting in implementation of the heating operation of the A2W indoor unit 300.

During the heating operation of the A2W indoor unit 300, the second expansion valve 204 of the A2A indoor unit 200 may be closed in conjunction with the A2A valve 120 so that the refrigerant does not generate the liquid refrigerant in the A2A indoor unit 200.

FIG. 10 is a view illustrating operation states of an A2A valve and a second expansion valve in the refrigerant cycle illustrated in FIG. 9.

Referring to FIG. 10, during the heating operation of the A2W indoor unit 300, the A2A valve 120 may be turned off and the second expansion valve 204 of the A2A indoor unit 200 may be closed to construct the cycle such that the refrigerant flows into the A2W indoor unit 300. Accordingly, the A2W indoor unit 300 may perform the radiation heating operation through heat exchange between the refrigerant and the water in the A2W heat exchanger 302.

When the radiation heating operation is performed in the A2W indoor unit 300, the second expansion valve 204 of the A2A indoor unit 200 may be closed. Therefore, the refrigerant discharged from the compressor 102 flows to the A2W indoor unit 300, so that an A2W heating operation using the A2W indoor unit 300 may be performed independently.

However, during the heating operation of the A2W indoor unit 300, the liquid refrigerant is accumulated in the indoor heat exchanger 202 of the A2A indoor unit 200 due to the refrigerant bypass to the stationary A2A indoor unit 200. As a result, the heating performance of the A2W indoor unit 300 may be deteriorated.

Accordingly, in the air conditioning system 1, in order to prevent deterioration of heating performance due to the refrigerant bypass to the stationary A2A indoor unit 200, the A2A valve 120 may be installed in the refrigerant pipe connecting the outdoor unit 100 and the A2A indoor unit 200.

Accordingly, during the heating operation of the A2W indoor unit 300, the A2A valve 120 is turned off to prevent the refrigerant from flowing into the stationary A2A indoor unit 200, thereby preventing the liquid refrigerant from being generated in the indoor heat exchanger 202 of the A2A indoor unit 200.

Accordingly, the refrigerant discharged from the compressor 102 flows into the A2W indoor unit 300 without flowing into the A2A indoor unit 200, so that the heating performance of the A2W indoor unit 300 may be prevented from deteriorating.

Figure 11:
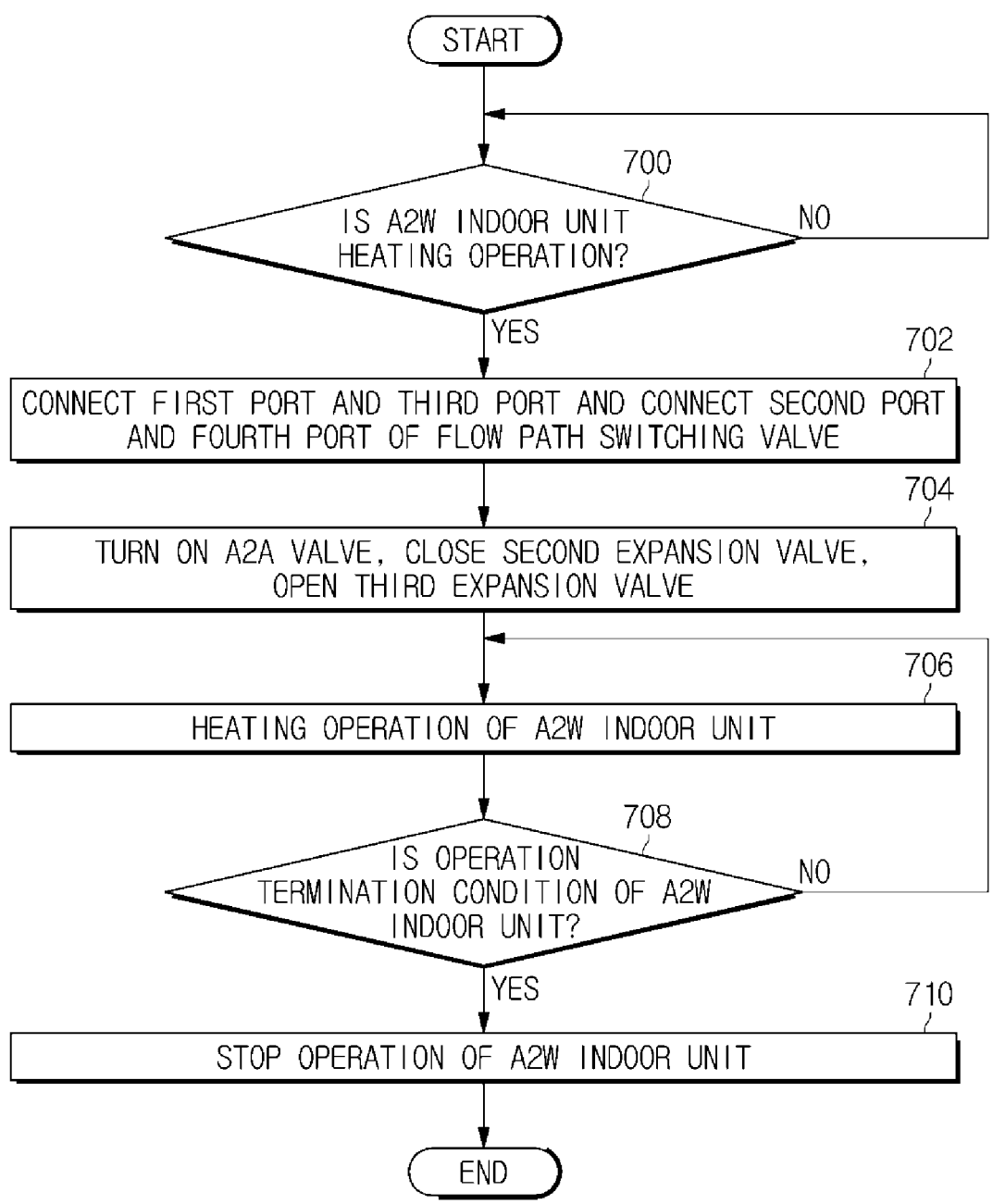
FIG. 11 is a flowchart illustrating a control algorithm of the refrigerant cycle illustrated in FIG. 9.

FIG. 11 is a flowchart illustrating a control algorithm of the refrigerant cycle illustrated in FIG. 9.

Referring to FIG. 11, the user operates the inputter 404 to set the operation information such as the operation mode (e.g., single heating operation of A2W indoor unit) of the air conditioning system 1, the target temperature of the indoor space, and the like. The operation information set by the user through the inputter 404 may be transmitted to the controller 402.

Accordingly, the controller 402 may receive various kind of operation information from the inputter 404, and determine whether the A2W indoor unit 300 is independently heating operation (700).

When it is the heating operation of the A2W indoor unit 300 (700), the controller 402 may operate the flow path switching valve 106 to connect the first port 106a and the third port 106c of the flow path switching valve 106 and to connect the second port 106b and the fourth port 106d, and may construct the refrigerant cycle illustrated in FIG. 9 (702).

The controller 402 may turn off the A2A valve 120 and open the third expansion valve 304 of the A2W indoor unit 300, and may thus construct the refrigerant cycle so that the refrigerant flows only into the A2W indoor unit 300 (704). At this time, during the heating operation of the A2W indoor unit 300, the second expansion valve 204 of the A2A indoor unit 200 is closed by interlocking with the A2A valve 120 so that flow of the refrigerant into the A2A indoor unit 200 is minimized and a pressure inside the A2A indoor unit 200 is lowered so that the impact sound is not generated.

When constructing the refrigerant cycle for the heating operation of the A2W indoor unit 300, the controller 402 may provide a predetermined delay time upon turning off the A2A valve 120, so as to prevent the impact sound generated due to sudden switching of the refrigerant path.

Therefore, the refrigerant cycle in which the refrigerant sequentially circulates the compressor 102→the flow path switching valve 106→the A2W heat exchanger 302→the third expansion valve 304 of the A2W indoor unit 300→the outdoor heat exchanger 108→the flow path switching valve 106→the accumulator 104→the compressor 102 may be constructed, resulting in implementation of the heating operation of the A2W indoor unit 300 (706).

When the temperature of the indoor space reaches the target temperature according to the heating operation of the A2W indoor unit 300, the controller 402 may determine whether the condition is the operation termination condition of the A2W indoor unit 300 (708).

When the operation termination condition of the A2W indoor unit 300 is not satisfied (708), the controller 402 may return to operation 706 to continue the heating operation of the A2W indoor unit 300.

On the other hand, when the operation termination condition of the A2W indoor unit 300 is satisfied (708), the controller 402 may stop the heating operation of the A2W indoor unit 300 (710).

While the present disclosure has been particularly described with reference to exemplary embodiments, it should be understood by those of skilled in the art that various changes in form and details may be made without departing from the spirit and scope of the present disclosure.

As described above, in the heating operation of the A2W indoor unit, the disclosure can prevent the inflow of the refrigerant into the A2A indoor unit, thereby securing the heating performance.

The invention claimed is:

1. An air conditioning system comprising:
    an outdoor unit having a compressor, a first heat exchanger, a first expansion valve, and a flow path switching valve;
    a first indoor unit having a second heat exchanger and a second expansion valve, configured to perform a cooling/heating operation through heat exchange between a refrigerant and air; and
    a second indoor unit having a third heat exchanger and a third expansion valve, configured to perform the cooling/heating operation through heat exchange between the refrigerant and water,
    wherein the flow path switching valve comprises a first port connected to the compressor, a second port connected to the second heat exchanger and the third heat exchanger via the first heat exchanger, a third port connected to the second heat exchanger and the third heat exchanger, and a fourth port connected to an accumulator of the outdoor unit which is connected to the compressor,
    wherein the air conditioning system further comprises:
        an air to air (A2A) valve installed in a refrigerant pipe between the third port of the flow path switching valve and the second heat exchanger, configured to change a refrigerant cycle formed between the outdoor unit and the first indoor unit and the second indoor unit; and
        a controller configured to control the A2A valve based on an operation mode of the first indoor unit and the second indoor unit to prevent flow of the refrigerant from the third port of the flow path switching valve to the second heat exchanger when the first indoor unit is stationary.

2. The air conditioning system according to claim 1, wherein the controller is configured to control an operation of the second expansion valve and the third expansion valve according to the operation mode of the first indoor unit and the second indoor unit to prevent the refrigerant bypass to one of the first indoor unit or the second indoor unit.

3. The air conditioning system according to claim 1, wherein, during a heating operation of the second indoor unit where the first heat exchanger operates as an evaporator and the third heat exchanger operates as a condenser, the controller is configured to control the A2A valve to block the refrigerant pipe connecting the outdoor unit and the first indoor unit when the first indoor unit is stationary.

4. The air conditioning system according to claim 3, wherein, during the heating operation of the second indoor unit, the controller is configured to operate the second expansion valve in conjunction with the A2A valve to prevent flow of the refrigerant flowing into the first indoor unit.

5. The air conditioning system according to claim 1, wherein, during a heating operation of the first indoor unit where the first heat exchanger operates as an evaporator and the second heat exchanger operates as a condenser, the controller is configured to turn on the A2A valve and close the third expansion valve to construct a refrigerant cycle in which the refrigerant flows into the first indoor unit.

6. The air conditioning system according to claim 1, wherein, during a heating operation of the second indoor unit where the first heat exchanger operates as an evaporator and the third heat exchanger operates as a condenser, the controller is configured to turn off the A2A valve and close the second expansion valve to construct a refrigerant cycle in which the refrigerant flows into the second indoor unit.

7. The air conditioning system according to claim 1, wherein, when the first indoor unit and the second indoor unit are operated simultaneously, the controller is configured to turn off the A2A valve and open the second expansion valve and the third expansion valve to construct a refrigerant cycle in which the refrigerant flows into the first indoor unit and the second indoor unit.

8. The air conditioning system according to claim 7, wherein, when the first indoor unit and the second indoor unit are operated simultaneously, the controller is configured to alternately operate the first indoor unit and the second indoor unit sequentially.

9. The air conditioning system according to claim 1, wherein the first indoor unit is an air to air (A2A) indoor unit that performs the cooling/heating operation in an A2A mode by heat exchanging the refrigerant with the air through the second heat exchanger.

10. The air conditioning system according to claim 1, wherein the second indoor unit is an air to water (A2W) indoor unit that performs the cooling/heating operation in an A2W mode by heat exchanging the refrigerant with the water through the third heat exchanger.

11. A method of controlling an air conditioning system comprising an outdoor unit having a compressor, a first heat exchanger, a first expansion valve, and a flow path switching valve, a first indoor unit having a second heat exchanger and a second expansion valve, configured to heat exchange a refrigerant with air, and a second indoor unit having a third heat exchanger and a third expansion valve, configured to heat exchange the refrigerant with water, the method comprising:
    determining whether the second indoor unit is in a heating operation where the first heat exchanger operates as an evaporator and the third heat exchanger operates as a condenser;
    when the second indoor unit is the heating operation, controlling an air to air (A2A) valve connecting the flow path switching valve of the outdoor unit and the second heat exchanger to prevent flow of the refrigerant from a third port of the flow path switching valve to the second heat exchanger;

operating the second expansion valve in conjunction with the A2A valve to prevent flow of the refrigerant flowing into the first indoor unit; and operating the third expansion valve to construct a refrigerant cycle in which the refrigerant flows into the second indoor unit to perform the heating operation of the second indoor unit, wherein the flow path switching valve comprises a first port connected to the compressor, a second port connected to the second heat exchanger and the third heat exchanger via the first heat exchanger, the third port connected to the second heat exchanger and the third heat exchanger, and a fourth port connected to an accumulator of the outdoor unit which is connected to the compressor.

12. The method according to claim 11, further comprising:

determining whether the first indoor unit is in the heating operation where the first heat exchanger operates as an evaporator and the second heat exchanger operates as a condenser;

when the first indoor unit is in the heating operation, controlling the A2A valve to connect the outdoor unit and the first indoor unit; and operating the second expansion valve to construct the refrigerant cycle in which the refrigerant flows into the first indoor unit to perform the heating operation of the first indoor unit.

13. The method according to claim 11, further comprising:

controlling the A2A valve according to an operation mode of the first indoor unit and the second indoor unit to prevent flow of the refrigerant from the third port of the flow path switching valve to the second heat exchanger when the first indoor unit is stationary.

14. The method according to claim 11, further comprising:

controlling the second expansion valve and the third expansion valve according to an operation mode of the first indoor unit and the second indoor unit to prevent refrigerant bypass to one of a first indoor unit or the second indoor unit.

15. The method according to claim 11, further comprising:

determining whether the first indoor unit and the second indoor unit are operated simultaneously; and when the first indoor unit and the second indoor unit are operated simultaneously, alternately opening the second expansion valve and the third expansion valve to construct the refrigerant cycle in which the refrigerant flows into the first indoor unit and the second indoor unit.

* * * * *